United States Patent
Skillicorn et al.

(10) Patent No.: US 7,349,551 B2
(45) Date of Patent: Mar. 25, 2008

(54) LAPEL MICROPHONE WITH PUSH TO TALK SWITCH

(75) Inventors: Greg Skillicorn, Grainger Township, OH (US); Joseph Birli, Munson, OH (US); Lou Monaco, S. Euclid, OH (US); Dave Potts, Parma Hts., OH (US)

(73) Assignee: Ultra Electronics Audiopack, Inc., Garfield Heights, OH (US)

( * ) Notice: Subject to any disclaimer, the term of this patent is extended or adjusted under 35 U.S.C. 154(b) by 615 days.

(21) Appl. No.: 10/934,149

(22) Filed: Sep. 3, 2004

(65) Prior Publication Data

US 2006/0050917 A1 Mar. 9, 2006

(51) Int. Cl.
H04R 25/00 (2006.01)
H04R 1/02 (2006.01)

(52) U.S. Cl. .................. 381/384; 381/376; 381/394; 381/395

(58) Field of Classification Search ............... 381/355, 381/361, 364, 367, 182, 370, 374–376, 384, 381/386, 388, 394, 395; 455/575.1, 575.2
See application file for complete search history.

(56) References Cited

U.S. PATENT DOCUMENTS

| | | |
|---|---|---|
| 3,174,129 A | 3/1965 | Laughlin et al. |
| 4,901,356 A | 2/1990 | Bauer |
| 4,949,806 A | 8/1990 | Hofer |
| 5,101,504 A | 3/1992 | Lenz |
| 5,138,666 A | 8/1992 | Bauer |
| 5,371,804 A | 12/1994 | Bauer |
| 5,428,688 A | 6/1995 | Becker et al. |
| 5,463,693 A | 10/1995 | Birli et al. |
| 5,566,362 A | 10/1996 | Bauer et al. |
| 5,793,855 A * | 8/1998 | Peck ..................... 379/175 |
| 5,825,718 A | 10/1998 | Ueki et al. |
| 5,884,199 A | 3/1999 | Maki |
| 6,179,666 B1 | 1/2001 | Osborn |
| 6,394,091 B1 | 5/2002 | Giorgini |
| 6,763,245 B1 | 7/2004 | Satoh et al. |
| 6,810,129 B2 | 10/2004 | Nakada |
| 7,089,930 B2 | 8/2006 | Adams |
| 7,110,743 B2 | 9/2006 | Depew et al. |
| 7,221,966 B2 | 5/2007 | Birli et al. |
| 2003/0224838 A1 | 12/2003 | Skillicorn et al. |
| 2005/0063561 A1 | 3/2005 | Birli et al. |

(Continued)

Primary Examiner—Curtis Kuntz
Assistant Examiner—Tuan D Nguyen
(74) Attorney, Agent, or Firm—Fay Sharpe LLP; Brian E. Turung

(57) ABSTRACT

A microphone-speaker assembly includes a housing, a microphone, a speaker, and a push-to-talk switch. The housing supports the speaker for movement between a first position in which the switch is not activated and a second position in which the switch is activated. The switch is located in a water resistant chamber along with a circuit board. The speaker moves toward the circuit board when it moves from the first position to the second position. A seal supports the speaker for movement between the first and second positions. A method of activating a microphone in a microphone-speaker assembly includes the steps of applying force to a speaker of the assembly, and moving the speaker thereby to activate the switch thereby to activate the microphone. The speaker moves relative to a push to talk switch, deforming a resilient membrane that helps to form a water resistant chamber in the assembly.

41 Claims, 4 Drawing Sheets

U.S. PATENT DOCUMENTS

2005/0201548 A1 9/2005 Birli et al.
2005/0213782 A1 9/2005 Miller et al.
2006/0050917 A1 3/2006 Skillicorn et al.
2006/0177084 A1 8/2006 Skillicorn et al.
2007/0049360 A1 3/2007 Birli et al.

* cited by examiner

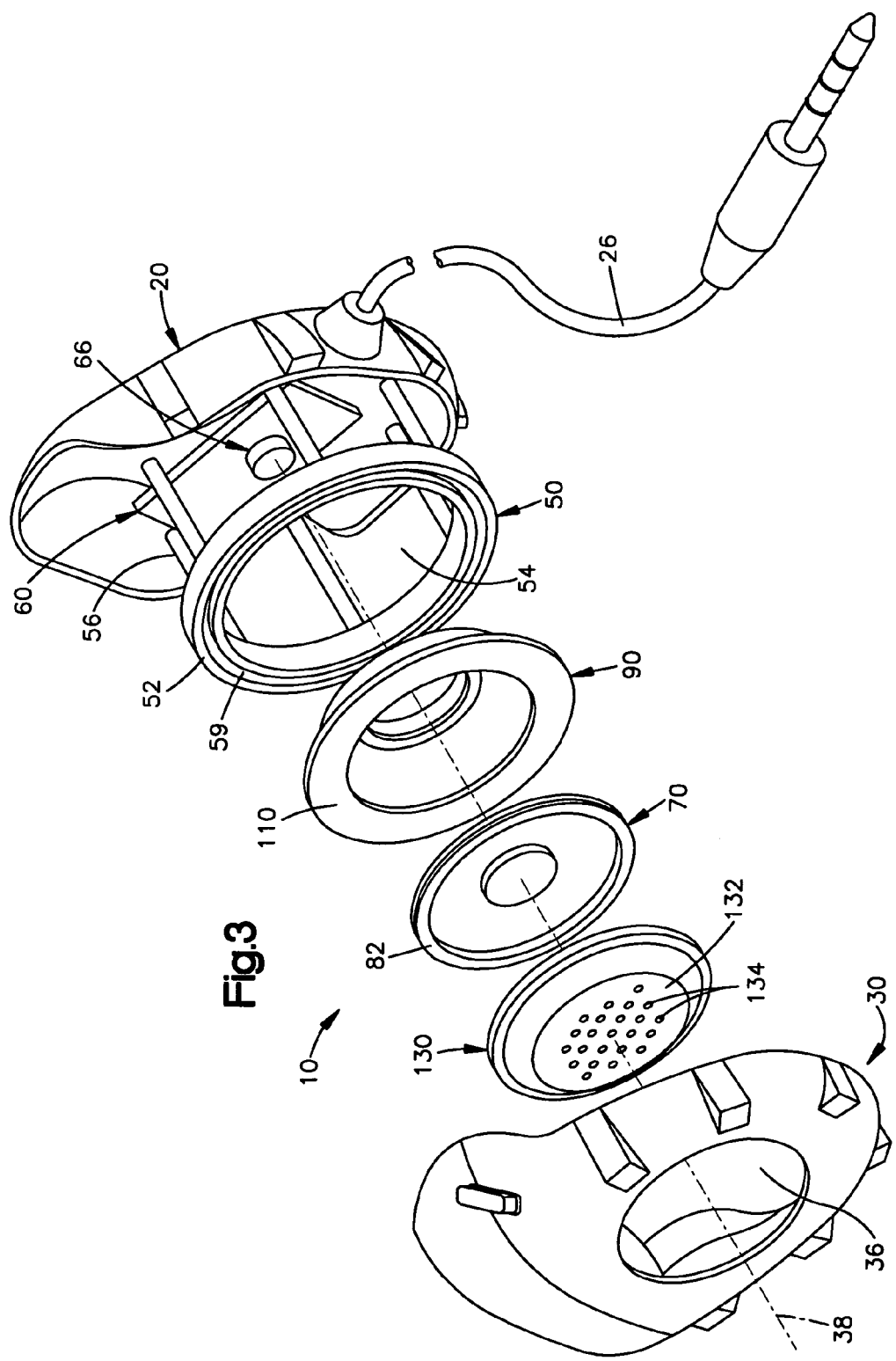

LAPEL MICROPHONE WITH PUSH TO TALK SWITCH

TECHNICAL FIELD

The present invention relates to a microphone-speaker assembly. In particular, the invention relates to a lapel unit, for example for connection with a user-mounted walkie-talkie, that includes a speaker, a microphone, and a push to talk switch for activating the microphone. The invention can be used with any 2 way radio that supports a remote lapel mic. This includes vehicle mounted radios and communications systems.

BACKGROUND OF THE INVENTION

Traditionally, lapel units for connection with a user-mounted walkie-talkie include a speaker, a microphone, and a push to talk switch for activating the microphone. The switch is often relatively small and thus may be difficult to locate by a user wearing gloves, for example. In addition, the switch may be located on a side or corner of the unit which is not always quickly and readily located by the user.

SUMMARY OF THE INVENTION

The present invention relates to a microphone-speaker assembly that includes a housing, a microphone, a speaker, and a push-to-talk switch. The assembly may be for use as a lapel unit to be connected with a user-carried transceiver. The housing supports the speaker for movement between a first position in which the push-to-talk switch is not activated and a second position in which the push-to-talk switch is activated. The housing at least partially defines a water resistant chamber, and the push-to-talk switch is located in the water resistant chamber along with a circuit board. The speaker moves toward the circuit board when it moves from the first position to the second position. The assembly preferably includes a seal that supports the speaker for movement between the first position and the second position.

The invention also relates to a method of activating a microphone in a microphone-speaker assembly. The method includes the steps of applying force to a speaker of the assembly, and moving the speaker thereby to activate the switch thereby to activate the microphone. The speaker moves relative to a push to talk switch, deforming a resilient membrane in the assembly. The resilient membrane helps to form a water resistant chamber in the assembly.

BRIEF DESCRIPTION OF THE DRAWINGS

FIG. 3 is an exploded perspective view of the microphone-speaker assembly of FIG. 1;

DETAILED DESCRIPTION OF THE INVENTION

Figure 2:
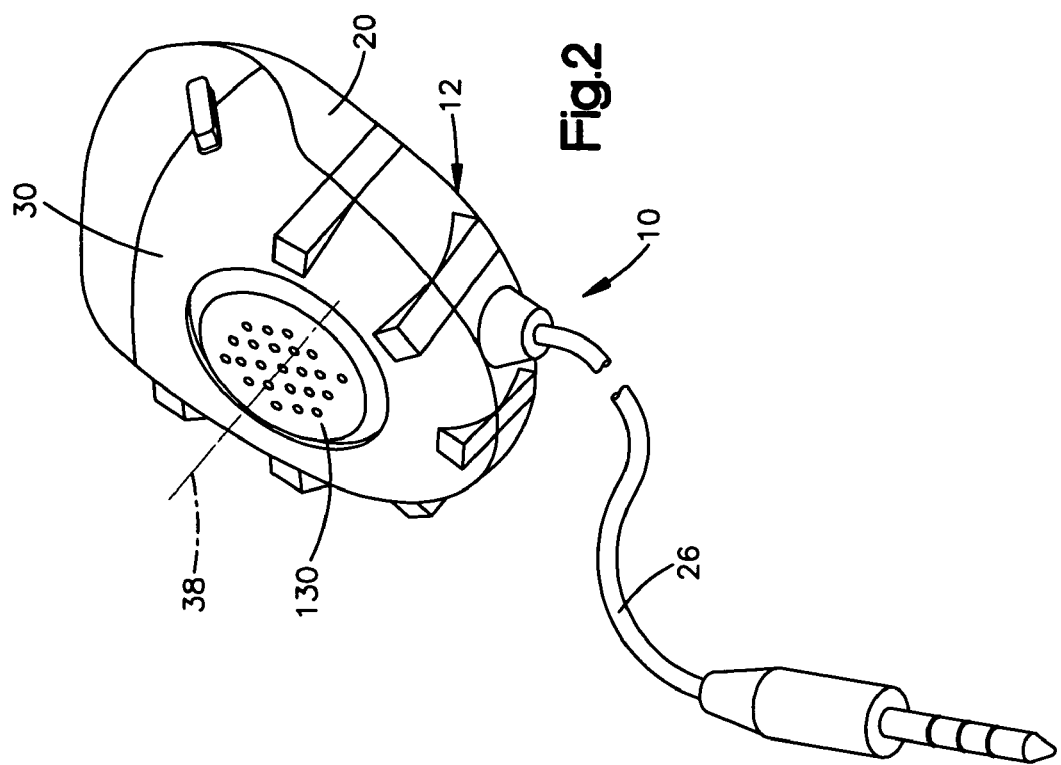
FIG. 2 is an enlarged perspective view of the microphone-speaker assembly of FIG. 1.
Figure 1:
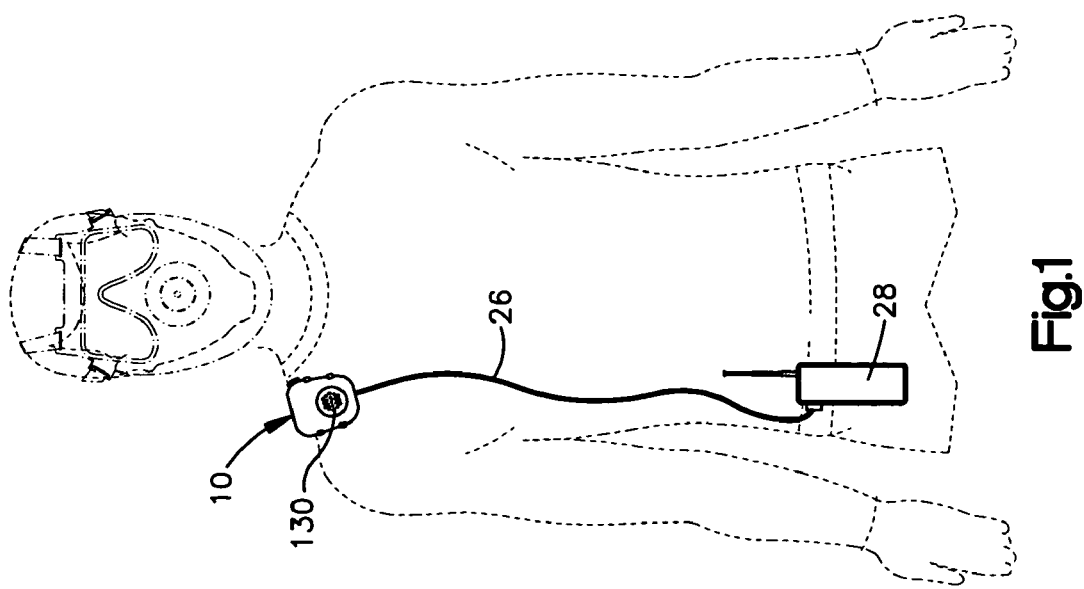
FIG. 1 is a schematic illustration of a microphone-speaker assembly in accordance with the invention, being worn by a user and connected with a walkie-talkie.

The present invention relates to a microphone and speaker assembly and, in particular, to a microphone and speaker assembly that is suitable for use as a lapel unit connected to a transceiver, such as a walkie-talkie. The invention is applicable to microphone and speaker assemblies of varying constructions. As representative of the invention, FIG. 1 illustrates a microphone and speaker assembly 10 in accordance with a first embodiment of the invention.

The assembly 10 includes a housing 12. The housing 12 includes a base 20 and a cover 30. The base 20 is preferably molded as one piece from a suitable material, such as plastic.

The configuration of the base 20 is adapted to support and enclose other components of the assembly. The base 20 is generally bowl shaped and includes a flat back wall 22 and a side wall 24 that extends upward from the back wall to form a partially closed space. A cable 26 extends from the base 20 and is connectable with a transceiver 28, such as a walkie-talkie.

The cover 30 is preferably molded as one piece from a suitable material, such as plastic. The configuration of the cover 30 is adapted to enclose, together with the base 20, the other components of the assembly 10.

The cover 30 is generally bowl shaped, with a flat front wall 32 and a curved side wall 34 that extends from the front wall towards the base 20. A circular speaker grill opening 36 is defined within the front wall of the cover 30. The opening 36 is centered on an axis 38. The cover 30 has an inner surface 40 facing towards the base 20 and an outer surface 42 facing outward from the base.

The side walls 32 and 22 of the cover 30 and the base 20, respectively, are complementary with each other. Thus, when the cover 30 and the base 20 are assembled together, the partially closed spaces of both the cover and the base combine to form one closed space that encloses, or houses, the other components of the assembly 10. The housing 12 includes a gasket 44 (FIG. 4) located between the cover 30 and the base 20 to help form a water resistant seal in the housing.

The cover 30 and the base 20 are secured to each other by fastening means not shown. Several methods of assembling the base 20 and cover 30 together could be used, such as glue, screws, interengaging tabs and slots, etc.

The lapel microphone-speaker assembly 10 also includes a support ring 50. The support ring 50 is preferably molded as one piece from a suitable material, such as plastic. The support ring 50 could also be constructed from several pieces that are assembled together.

The support ring 50 includes an annular seat 52 defining a central opening 54. The central opening 54 is coaxial with the speaker grill opening 36 in the front wall 32 of the cover 30. The seat 52 of the support ring 50 has a support surface 58 facing outward from the base 20 when the support ring is mounted on the base 20. A groove 59 with a rectangular cross-sectional configuration is defined within the support surface 58 of the annular seat 52.

The support ring 50 also includes a plurality of support members in the form of posts 56 that project downward from the annular seat 52 towards the back wall 22 of the base 20. The posts 56 engage the back wall 22 of the base 20 and support the annular seat 52 at a distance from the back wall of the base. The posts 56 may engage in sockets (not shown) in the back wall 22 of the base 20, or be otherwise connected to the base. The support ring 50 shown in the illustrated embodiment includes six posts 56, although different numbers, cross-sectional shapes and configurations of support members could be used. Additionally, other methods of supporting the annular seat 52 on the base 20 could be used. For example, the functions of the support ring 50 could be provided by the base 20 itself.

The assembly 10 also includes a circuit board 60. The circuit board 60 is a printed circuit board 60 and includes various electrical circuitry (described below). The circuit board has an upper surface 62 facing away from the back wall 22 of the base 20 and an opposite lower surface 64 facing towards the back wall of the base. The circuit board 60 is mounted, by fastening means not shown, on the back wall 22 of the base 20, below the annular seat 52 of the support ring 50, in a position generally aligned with the central opening 54 of the support ring A push-to-talk switch 66 is located on the circuit board 60. The push-to-talk switch 66 is located on the upper surface 62 of the circuit board 60, facing away from the back wall 22 of the base. The push-to-talk switch 66 is aligned with and accessible through the central opening 54 of the support ring 50. The switch 66 may be located on the axis 38. Many different types of electrical switches could be used as the push-to-talk switch 66, such as a dome switch, etc.

The assembly 10 further includes a speaker 70. In the illustrated embodiment the speaker 70 is a water resistant cone speaker, although other types of speaker could be used. The speaker 70 has a generally frustoconical shape centered on the axis 38. Because of its frustoconical configuration, the speaker 70 has a wide end 72 and a narrow end 74. The speaker 70 includes a magnet and voice coil assembly 76 at its narrow end. The speaker 70 is electrically connected with the circuit board 60 as shown schematically at 78 in FIG. 4.

The speaker 70 also includes a bowl shaped frame 80 made of suitable metal or plastic material. The speaker frame 80 includes a rim 82 and supports the magnet and voice coil assembly 76.

The assembly 10 also includes a seal 90. The seal 90 is preferably molded as one piece out of a suitable deformable material, such as rubber or another elastomeric material. As described below, the seal 90 cooperates with the base 20 and the cover 30 to form a water resistant chamber in the housing 12.

The seal 90 is generally bowl shaped and is adapted to closely surround the speaker 70. The seal 90 could be shaped or configured in different ways to enclose and support whatever speaker 70 is chosen for the assembly 10. The seal 90 has a lower portion 92 adapted to enclose and support the magnet assembly 76 of the speaker 70. The lower portion 92 of the seal 90 includes a flat, circular back wall 98 centered on the axis 38, and a side wall 100 that extends upward from the back wall.

A central portion 102 of the seal 90 includes a side wall 104 that extends radially outward from the side wall 100 of the lower portion 92 and then ramps upward in a direction axially away from the base 20 and radially outward away from the axis 38. The side wall 104 of the central portion 102 is adapted to follow the profile of the speaker frame 80 and to mimic the generally frustoconical shape of the speaker 70.

The seal 90 has an upper portion 106. The upper portion 106 of the seal 90 includes a side wall 108 that extends axially upward from the side wall 104 of the central portion 102. The seal 90 has a flat, annular rim 110 that extends from the upper portion 106 of the seal. An inner portion 112 of the rim 110 extends radially inward from the upper portion 106 of the seal 90, in a direction toward the axis 38. The inner portion 112 of the rim 110 defines a circular opening 114 in the seal 90 that is centered on the axis 38. An outer portion 116 of the rim 110 extends radially outward from the upper portion 106 of the seal 90.

Both the inner and outer portions 112 and 116 of the rim 110 have an outer surface 120 facing away from the base 20 and an inner surface 122 facing toward the base. An annular lip 124 is formed on the bottom surface 122 of the outer portion 106 of the seal rim 110. The lip 124 extends from the seal rim 110 in a direction parallel to the side wall 108 of the upper portion 106 of the seal 90. The lip 124 is received within the annular groove 60 on the seat 52 of the support ring 50.

The seal 90 is thus supported on the annular seat 52 of the support ring 50, at a distance from the base 20. The speaker 70 fits within the seal 90 and is supported and enclosed by the seal. A gap is defined between the speaker rim 82 and the inner portion 112 of the rim 110 of the seal 90. A gap 128 is defined between the back wall 98 of the lower portion 92 of the seal 90 and the push-to-talk switch 66 located on the upper surface 62 of the circuit board 60.

The assembly 10 also includes a speaker grill 130. The speaker grill 130 is preferably molded as one piece out of a suitable material, such as plastic, fiberglass or metal. The speaker grill 130 has a flat or domed, circular front wall 132 centered on the axis 38. A plurality of holes or other shaped openings 134 are defined in the front wall 132 to permit sound waves projected from the speaker 70 to travel outward from the assembly 10.

The speaker grill 130 has an outer peripheral flange 136. The flange 136 of the speaker grill 130 is secured in the gap between the speaker rim 82 and the inner portion 112 of the rim 110 of the seal 90. When the seal 90, speaker 70 and speaker grill 130 fit together they are co-axial. When the cover 30 is assembled to the base 20 as described above, the inner surface 40 of the cover contacts the rim 110 of the seal 90 and clamps it against the seat 52 of the support ring 50. This clamping of the seal 90 against the support ring 50 secures the seal, the speaker 70 and the speaker grill 130 in place. The seal 90 supports the speaker grill 130 and the speaker 70 resiliently on the support ring 50.

With the housing 12 thus assembled to the seal 90, a water resistant chamber 140 is formed in the housing 12. The chamber 140 is defined by the base 20; the cover 30; the gasket 44 between the base and the cover; and the seal 90. The circuit board 60 and the switch 66 are located inside the water resistant chamber 140. The speaker 70 is located outside that water resistant chamber.

The assembly 10 includes a microphone shown schematically at 142. The microphone 142 is located on the outer surface 42 of the cover 30. The microphone 142 is electrically connected with the circuit board by wires shown schematically at 144.

When a user of the lapel speaker-microphone assembly 10 wishes to activate the microphone 142, the user pushes on the speaker grill 130. The force on the speaker grill 130 is transmitted to the rim 82 of the speaker 70 and causes the speaker, which is resiliently supported by the seal 90, to move toward the base 20. The speaker grill 130 follows.

As the speaker grill 130 and the speaker 70 move toward the base 20, the speaker pushes against the lower and central portions 92 and 102 of the seal 90. The side walls 108, 104, and 100 of the upper, central and lower portions 106, 102 and 92, respectively, of the seal 90 stretch as the speaker grill 130 and the speaker 70 push inward on the seal, thus deforming the seal.

When the speaker grill 130 and the 70 speaker are pushed inward a sufficient amount, the back wall 98 of the seal 90 contacts the push-to-talk switch 66 located on the circuit board 60. The switch 66 is activated, thus activating the microphone 142.

When the force on the speaker grill 130 is thereafter released, the resilience of the elastomeric seal 90 pulls the speaker 70 and the speaker grill back toward their starting position. As this movement occurs, the lower portion 92 of the seal 90 moves away from the circuit board 60, and the switch 66 is deactivated.

The speaker grill 130 is relatively large compared to the switch 66, and also compared to other push to talk switches. For example, the speaker grill 130 could be one inch or more in diameter in a lapel unit 10. Therefore, it is relatively easy for a user of the assembly 10 to push on the speaker grill 130 to activate the microphone 142, even if the user is wearing gloves, for example. In addition, it is relatively easy for the user to locate the area on the exterior of the assembly 10 at which the user needs to apply force to activate the microphone 142, because that location, the speaker grill 130, is relatively large. The user need only swipe his or her hand across the front of the unit 10, to activate the switch 66.

Figure 4:
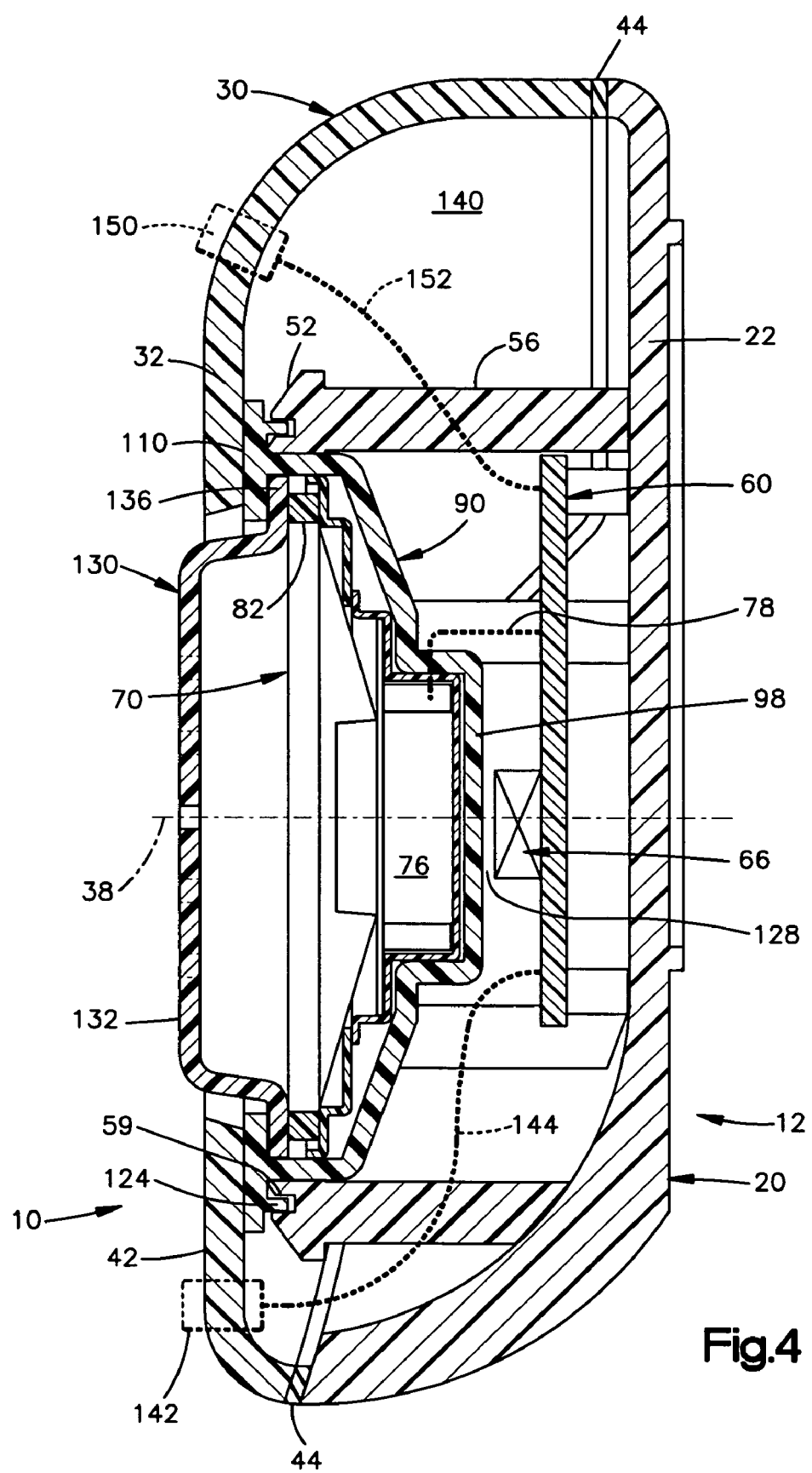
FIG. 4 is an assembled sectional view of the microphone-speaker assembly of FIG. 1.
Figure 5:
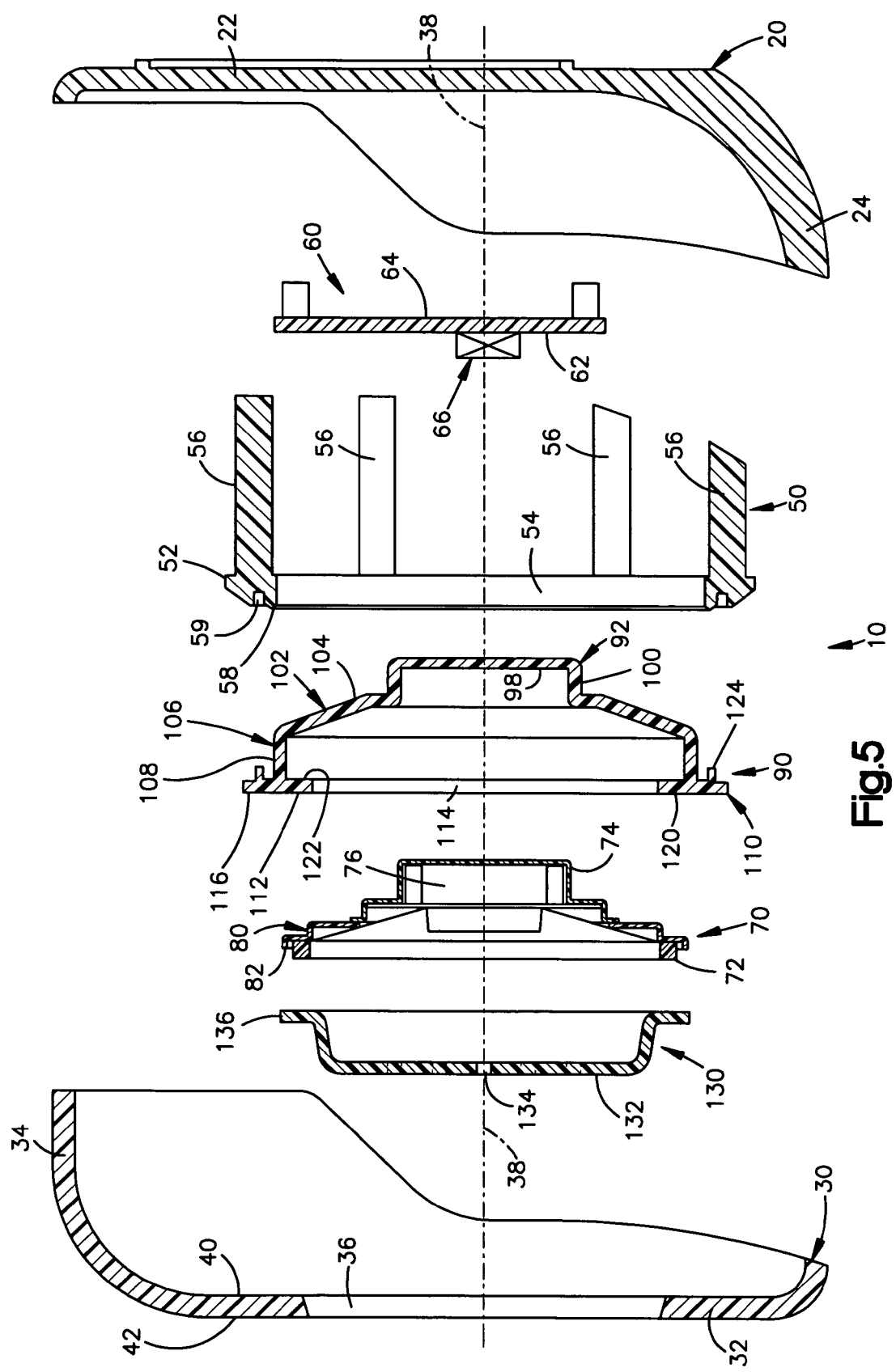
FIG. 5 is an exploded sectional view of the microphone-speaker assembly of FIG. 1.

In one embodiment of the present invention, the lapel speaker-microphone assembly 10 includes an optional second push-to-talk switch 150 (FIG. 4). The second push-to-talk switch 150 may be the normal one found in prior art lapel units. The second push-to-talk switch 150 is located on the outer surface 42 of the front wall 32 or side wall 34 of the cover 30. The second push-to-talk switch 150 is electrically connected with the circuit board as shown schematically at 152.

Typically, the power for a lapel speaker-microphone assembly 10 of the type shown is provided, through the cable 26, by the walkie-talkie 28 to which the lapel unit is connected. A lapel unit 10 in accordance with the present invention may optionally include a battery, rather than be powered over the cable. The battery would be located within the housing 12 and be electronically connected with the circuit board 60 by wires.

A lapel speaker microphone assembly 10 in accordance with the present invention may include additional circuitry to provide the user with additional functions. For example, the assembly 10 may include circuitry to allow for interfacing to several different types of walkie-talkies. Additional circuitry could allow for interfacing with a mask-mounted microphone-speaker system. This circuitry would disable the microphone 142 in the lapel speaker-microphone assembly 10 whenever this mask mounted microphone-speaker system is attached.

The lapel unit 10 could also include an emergency button. When the emergency button is pressed and released the microphone 142 of the assembly 10 would remain activated for an expended period, for example, up to fifteen seconds or more. Other variations and modifications of the invention, within the ordinary skill of the art, are intended also to be covered by the appended claims.

Having described the invention, we claim:

1. A microphone-speaker assembly that is adapted to be used as a lapel unit that is connected to a remotely located transceiver, said microphone-speaker assembly comprising a housing having a base, a cover and a housing chamber defined therebetween, a circuit board positioned in said housing, a speaker positioned in said housing chamber and electrically connected said circuit board, a microphone electrically connected to said circuit board, a talk switch electrically connected to said circuit board, a speaker seal, and a speaker grill, said cover including a speaker grill opening, said speaker grill at least partially positioned in said speaker grill opening and movable relative to said grill opening, said speaker seal engaging said base of said housing, said cover of said housing, and combinations thereof to form a water-tight region about said circuit board positioned in said housing chamber, said speaker movable between a first position in which said talk switch is not activated and a second position in which said talk switch is activated to activate said microphone, said speaker seal at least partially deformable to enable movement of said speaker without breaking said water-tight region about said circuit board, said movement of said speaker from said first position to said second position causing said speaker seal to at least partially deform.

2. The microphone-speaker assembly as defined in claim 1, including a support ring positioned in said housing chamber, said support ring including a seat that defines an opening in said support ring, said support ring is positioned in said housing chamber such that said opening is substantially coaxial with said speaker grill opening in said cover of said housing, said support ring designed to facilitate in supporting said speaker in said housing.

3. The microphone-speaker assembly as defined in claim 2, wherein a top surface of said seat of said support ring includes a groove, said speaker seal includes an upper annular rim having a lip configured to at least partially fit into said groove in said top surface of said seat of said support ring to form a water tight seal between said speaker seal and said support ring.

4. The microphone-speaker assembly as defined in claim 3, wherein a bottom surface of said seat of said support ring includes a plurality of posts that project downwardly from said bottom surface, at least one of said post of said support ring engage said base of said housing to support said support ring in said housing chamber.

5. The microphone-speaker assembly as defined in claim 4, wherein said circuit board is positioned in said housing chamber such that at least a portion of said circuit board is axially aligned with said opening of said seat of said support ring and said speaker grill opening in said cover of said housing.

6. The microphone-speaker assembly as defined in claim 5, wherein at least a portion of said talk switch on said circuit board is axially aligned with said opening of said seat of said support ring and said speaker grill opening in said cover of said housing.

7. The microphone-speaker assembly as defined in claim 6, wherein said base and cover are connected together to form a water-tight seal.

8. The microphone-speaker assembly as defined in claim 7, wherein said speaker grill is axially movable in said cavity of said speaker seal.

9. The microphone-speaker assembly as defined in claim 8, wherein said microphone is positioned on said cover of said housing.

10. The microphone-speaker assembly as defined in claim 9, including a cable secured to said housing and designed to transmit a signal between said housing and the remotely located transceiver.

11. The microphone-speaker assembly as defined in claim 10, including a push-to-talk switch located on an outside surface of said housing.

12. The microphone-speaker assembly as defined in claim 11, wherein said speaker is not located in said water-tight region in said housing.

13. The microphone-speaker assembly as defined in claim 12, wherein said speaker moves toward said circuit board when said speaker moves from the first position to the second position.

14. The microphone-speaker assembly as defined in claim 2, wherein a bottom surface of said seat of said support ring includes a plurality of posts that project downwardly from said bottom surface, at least one of said post of said support ring engage said base of said housing to support said support ring in said housing chamber.

15. The microphone-speaker assembly as defined in claim 2, wherein said circuit board is positioned in said housing chamber such that at least a portion of said circuit board is axially aligned with said opening of said seat of said support ring and said speaker grill opening in said cover of said housing.

16. The microphone-speaker assembly as defined in claim 15, wherein at least a portion of said talk switch on said circuit board is axially aligned with said opening of said seat of said support ring and said speaker grill opening in said cover of said housing.

17. The microphone-speaker assembly as defined in claim 1, wherein said base and cover are connected together to form a water-tight seal.

18. The microphone-speaker assembly as defined in claim 17, including a gasket that is at least partially positioned between said base and cover, said gasket at least partially forming a water tight seal between said base and cover.

19. The microphone-speaker assembly as defined in claim 1, wherein said speaker grill is axially movable in said cavity of said speaker seal.

20. The microphone-speaker assembly as defined in claim 1, wherein said microphone is positioned on said cover of said housing.

21. The microphone-speaker assembly as defined in claim 1, including a cable secured to said housing and designed to transmit a signal between said housing and the remotely located transceiver.

22. The microphone-speaker assembly as defined in claim 1, including a push-to-talk switch located on an outside surface of said housing.

23. The microphone-speaker assembly as defined in claim 1, wherein said speaker is not located in said water-tight region in said housing.

24. The microphone-speaker assembly as defined in claim 1, wherein said speaker moves toward said circuit board when said speaker moves from the first position to the second position.

25. A microphone-speaker assembly comprising a housing, a circuit arrangement, a speaker electrically connected to said circuit arrangement, a microphone electrically connected to said circuit arrangement, a talk switch electrically connected to said circuit arrangement, and a depressible plate positioned on a front face of said housing, said depressible plate movable between a first position in which said talk switch is not activated and a second position in which said talk switch is activated to activate said microphone, wherein said housing includes a upper face surface, said upper face surface including a plate opening, said depressible plate at least partially positioned in said plate opening and movable relative to said plate opening, said plate opening and said depressible plate at least partially positioned over an upper surface of said speaker and wherein said depressible plate is a speaker grill.

26. The microphone-speaker assembly as defined in claim 25, wherein said depressible plate is connected or interconnected to said speaker to cause said speaker to move within said housing when said depressible plate moves between said first position and said second position.

27. The microphone-speaker assembly as defined in claim 26, including a speaker seal to form a water-tight region in housing, said speaker seal at least partially deformable to enable movement of said depressible plate, said speaker, or combinations thereof without breaking said water-tight region in said housing.

28. The microphone-speaker assembly as defined in claim 27, including a support ring positioned in said housing, said support ring designed to facilitate in supporting said speaker in said housing, said speaker seal forming a water tight seal between said speaker seal and said support ring when positioned in said housing.

29. The microphone-speaker assembly as defined in claim 28, including a cable secured to said housing and designed to transmit a signal between said housing and a remotely located transceiver.

30. The microphone-speaker assembly as defined in claim 29, including a push-to-talk switch located on an outside surface of said housing.

31. The microphone-speaker assembly as defined in claim 30, wherein said speaker moves toward a circuit board of said circuit arrangement when said depressible plate moves from the first position to the second position.

32. The microphone-speaker assembly as defined in claim 31, wherein said housing is part of a lapel unit to be connected with a transceiver that is carried by a user or that is vehicle mounted.

33. The microphone-speaker assembly as defined in claim 25, including a speaker seal to form a water-tight region in housing, said speaker seal at least partially deformable to enable movement of said depressible plate, said speaker, or combinations thereof without breaking said water-tight region in said housing.

34. The microphone-speaker assembly as defined in claim 33, including a support ring positioned in said housing, said support ring designed to facilitate in supporting said speaker in said housing, said speaker seal forming a water tight seal between said speaker seal and said support ring when positioned in said housing.

35. The microphone-speaker assembly as defined in claim 34, wherein a bottom surface of said support ring includes a plurality of posts that project downwardly from said bottom surface.

36. The microphone-speaker assembly as defined in claim 25, including a cable secured to said housing and designed to transmit a signal between said housing and a remotely located transceiver.

37. The microphone-speaker assembly as defined in claim 25, including a push-to-talk switch located on an outside surface of said housing.

38. The microphone-speaker assembly as defined in claim 25, wherein said speaker moves toward a circuit board of said circuit arrangement when said depressible plate moves from the first position to the second position.

39. The microphone-speaker assembly as defined in claim 25, wherein said housing is part of a lapel unit to be connected with a transceiver that is carried by a user or that is vehicle mounted.

40. A method of activating a microphone in a microphone-speaker assembly, the method comprising:
  providing a housing that includes a speaker at least partially in said housing, a depressible plate on a face of said housing, or combinations thereof;
  applying force to said speaker, said depressible plate or combinations thereof to cause said speaker, said depressible plate or combinations to move from a first to a second position, said movement of said speaker, said depressible plate or combinations thereof to said second position causing activation of a switch in said housing to thereby activate a microphone of said assembly and wherein said speaker is designed to move from said first position to said second position.

41. The method as defined in claim 40, including the step of maintaining a water-tight seal about at least a portion of circuitry in said housing by use of a deformable seal, said seal at least partially positioned between said circuitry and said speaker, said depressible plate or combinations thereof.

* * * * *